United States Patent [19]

Ruehenbeck

[11] Patent Number: 4,576,573

[45] Date of Patent: Mar. 18, 1986

[54] HEATING A FIXED-BED CHARGE IN A TUBE REACTOR, AND AN ARRANGEMENT FOR CARRYING OUT THE METHOD

[75] Inventor: Wolfgang Ruehenbeck, Birkenau, Fed. Rep. of Germany

[73] Assignee: BASF Aktiengesellschaft, Fed. Rep. of Germany

[21] Appl. No.: 565,219

[22] Filed: Dec. 23, 1983

[30] Foreign Application Priority Data

Dec. 29, 1982 [DE] Fed. Rep. of Germany ....... 3248502

[51] Int. Cl.$^4$ .................. F27B 15/00; C10G 35/00
[52] U.S. Cl. ........................... 432/15; 208/163; 432/27; 432/197
[58] Field of Search ................. 432/15, 27, 197; 208/163, 169

[56] References Cited

U.S. PATENT DOCUMENTS

| | | | |
|---|---|---|---|
| 3,117,064 | 1/1964 | Friedrich | 432/27 |
| 3,261,661 | 7/1966 | Javorsky et al. | 432/27 |
| 3,427,008 | 2/1969 | Geoffroy | 432/15 |

Primary Examiner—John J. Camby
Attorney, Agent, or Firm—Keil & Weinkauf

[57] ABSTRACT

A fixed-bed charge in a tube reactor is heated, and at the same time heat is conducted away from, or into, the fixed bed, by a method in which the fixed bed is heated by means of a fluidized material which conducts away and supplies heat and flows through the voids in the charge, and the heat is conducted away or supplied by means of a heat-transfer medium flowing in a heat exchanger, the latter being located in the fixed bed or in a fluidized layer formed above the fixed bed and consisting of the fluidized material.

6 Claims, 6 Drawing Figures

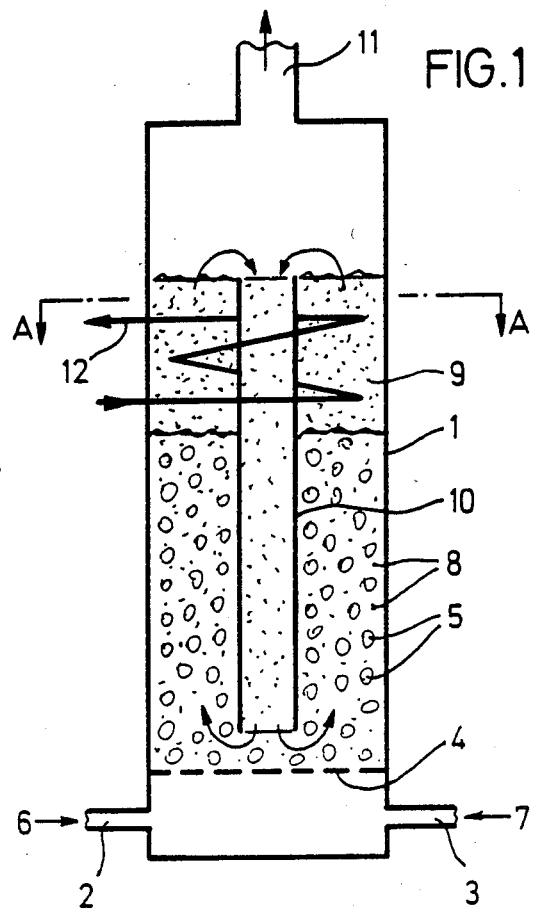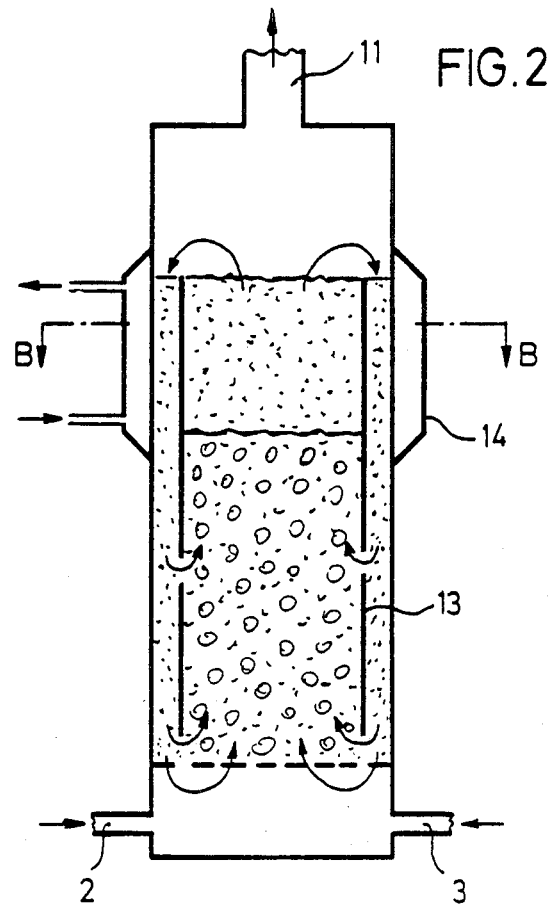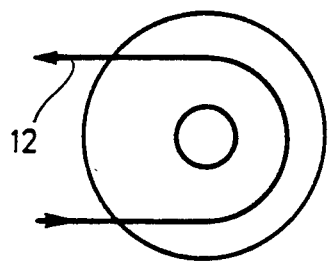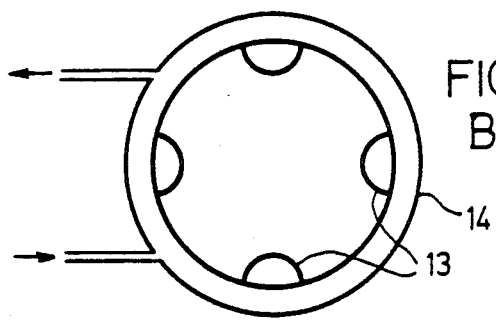

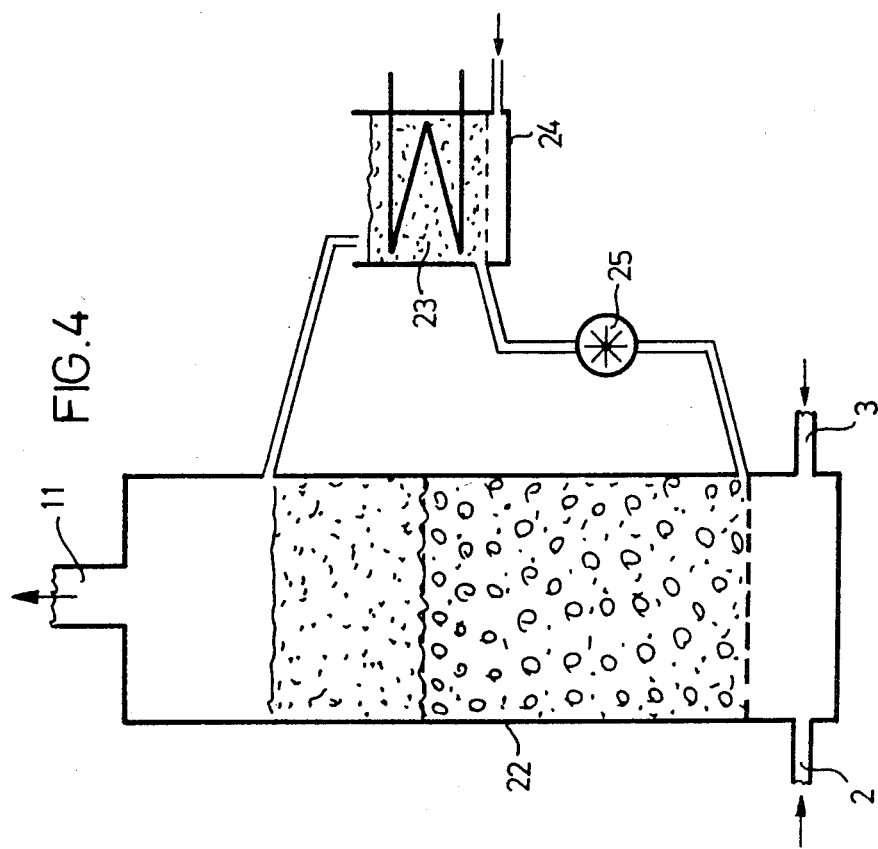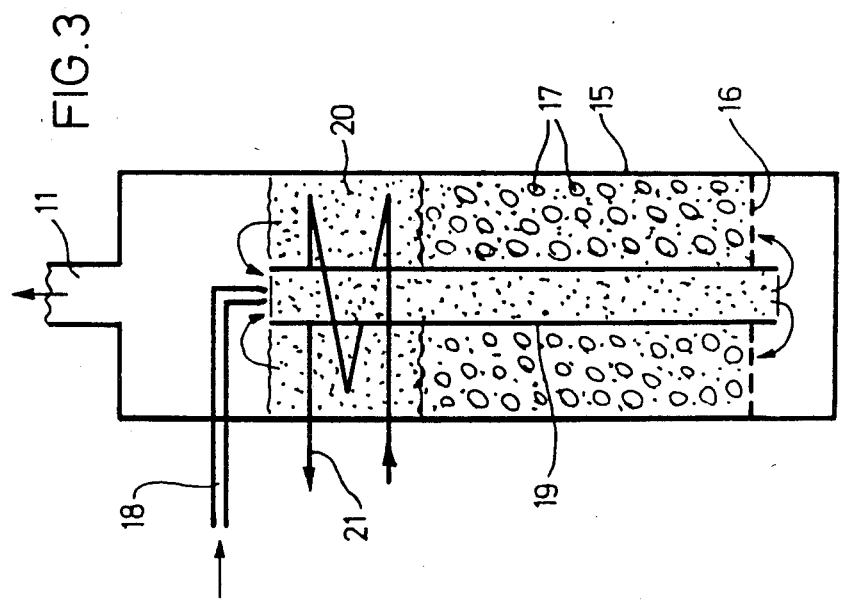

HEATING A FIXED-BED CHARGE IN A TUBE REACTOR, AND AN ARRANGEMENT FOR CARRYING OUT THE METHOD

The present invention relates to a method for heating a fixed-bed charge in a tube reactor and at the same time conducting heat away from, or into, the fixed bed, and an arrangement for carrying out the method.

In large-scale industrial processes for the preparation of chemical products, the reaction, for example heterogeneous gas catalysis or adsorption, frequently takes place in tube reactors or fixed-bed reactors.

In the case of such tube reactors, the catalyst is introduced, in the form of spheres, tablets or other geometrical shapes, into the reaction tubes, through which the reactant gases then flow during the reaction. In the processes, which are generally exothermic, a cooling medium (water, oil, a salt melt, etc.) circulates around the reaction tubes and removes the enthalpy of reaction from the tube reactor. Because of the low effective heat conductivity of the charge through which the gas flows, and the limited heat transfer coefficient at the tube wall, in the case of reactions accompanied by substantial heat of reaction the diameters of the reaction tubes are restricted, so that the desired capacity of the tube reactors can only be achieved by connecting a large number of individual tubes, for example as many as 22,000, in parallel. In addition to requiring high capital costs, this procedure also entails very technically complicated measures in order to achieve uniform distribution of the reactant gases and of the cooling medium.

It is an object of the present invention to avoid the above disadvantages.

We have found that this object is achieved, in accordance with the invention, if the fixed bed is heated by means of a fluidized material which conducts away and supplies heat and flows through the voids in the charge, and the heat is conducted away or supplied by means of a heat-transfer medium flowing in a heat exchanger, the latter being located in the fixed bed or in a fluidized layer formed above the fixed bed and consisting of the fluidized material. It is advantageous for the fluidized materials to be kept in circulation, recycling of the fluidized material being carried out either in tubes leading through the fixed bed, or outside the fixed bed. Moreover, this recycling can be adjusted according to the heat requirement of the fixed bed by means of suitable transporting elements, independently of the velocity of the reactant gases in the fixed bed.

Other sub-claims relate to further features of the novel arrangement for carrying out the method.

In the method according to the invention, the conventional mechanism for heating fixed-bed reactors by heat transfer at walls is replaced with the more effective mechanism of convection. In this method, the fixed bed is filled with a very free-flowing, fluidizible material which also readily conducts away and supplies heat, the amount of this material being sufficient not only for the voids in the charge to be filled but also for the fluidized material to form a layer of any desired thickness above the charge. When the reactant gases are passed into this arrangement at an optimum velocity, the fluidizible material is fluidized in the voids in the charge, and a fluidized layer is formed above the charge. The fluidized material is then brought into circulation by means of arrangements according to the invention, which are described in detail below, and are thus transported through the fixed bed. Recycling can take place inside or outside the fixed bed. As a result of intensive and direct contact with the fixed-bed particles and the reacting gases, the circulating fluidized material conducts heat away from or into, the fixed bed. Owing to this thorough, direct heating of the fixed bed, reactions accompanied by pronounced heat of reaction can also be carried out in single-tube reactors without, as in the case of the conventional systems, the diameter of the reactor tube being restricted by the limited effective heat conductivity of the charge.

Various examples of the arrangement according to the invention are illustrated in the drawing, and are described in more detail below.

FIGS. 1 and 1a show a longitudinal section and a cross-section through a single-tube reactor having a central tube for recycling the fluidized material, and a heat exchanger in the form of a coiled tube.

FIGS. 2 and 2a show a longitudinal section and a cross-section through a single-tube reactor having four half-tubes located at the inner periphery of the reactor for recycling the fluidized material, and a heat exchanger in the form of a jacket.

FIG. 3 shows a longitudinal section through another possible arrangement for carrying out the method.

FIG. 4 shows a longitudinal section through an arrangement for carrying out the method, wherein recycling and conduction of heat away from, or into, the fixed bed take place outside the single-tube reactor.

FIG. 1 shows a single-tube reactor 1 which is equipped with nozzles 2 and 3, and in which a fixed bed 5, consisting of a catalyst charge, is located on a perforated tray 4. The reactant gases 6 and 7 enter the reactor via nozzles 2 and 3. The fluidizible material 8 in the voids in the fixed bed and above the fixed bed in the form of a fluidized layer 9 is fluidized by the gases 6 and 7. The reactor contains a central tube 10, through which the fluidized material is recycled. The reacted gas leaves the reactor via a nozzle 11. Above the fixed bed, surrounded by the fluidized material in the form of a fluidized layer, is a heat exchanger 12, in the form of a coiled tube, through which a heat-transfer medium is fed in order to effect heat exchange between this medium and the fluidized material.

FIG. 2 shows another possible apparatus for recycling the fluidized material and another possible arrangement of the heat exchanger. Instead of the central tube for recycling the fluidized material, the single-tube reactor 1 contains several half-tubes 13 at its inner periphery. The heat exchanger, instead of being a coiled tube, is in the form of a jacket 14 at the level of the fluidized layer.

In the single-tube reactor which is shown in FIG. 2, and in which the fixed bed has a diameter of 80 mm and a height of 1,000 mm, a carbon-coated catalyst was regenerated by gassing with air at 600° C. through a Konidur tray. Into the voids in the fixed bed, abrasion-resistant material in the form of spheres of 150–250 μm size was introduced, as the inert fluidizible material, in an amount such that, at a velocity of 0.3 m/sec, based on the cross-section of the empty reactor, a fluidized layer about 300 mm high was formed above the fixed bed. The entire reactor was heated to 350° C. by means of the heat-transfer medium, which was passed through the jacket as a heating medium. The fluidizing gas used during the heating phase was nitrogen. When this was replaced with air, the regeneration began, and the reactor temperature increased to the desired value of 600° C., which could be maintained during the entire regeneration procedure. The enthalpy of reaction due to the combustion of the carbon was reliably conducted away via the heat transfer medium, which was passed through the jacket as a cooling medium.

In the single-tube reactor 15 shown in FIG. 3, the fixed bed 17 is located on a perforated tray 16. In this reactor, the fluidized material also collects below the perforated tray. The reactant gases, which simultaneously act as the fluidizing gas, are passed at high velocity through a tube 18 leading into the reactor and then through a central tube 19, and are deflected at the end of the perforated tray 16, so that the fluidizible material is entrained. The fluidized material and the fluidizing gas flow together through the fixed bed, and form, above the fixed bed, a fluidized layer 20, through which a heat exchanger 21 passes. In this type of arrangement, it was also possible reliably to conduct away the enthalpy of reaction by means of the cooling medium. In this apparatus, the arrangement of the gas feed 18 and of the recycling tube 19 as an injector resulted in a substantial increase in the recycling rate.

FIG. 4 shows a novel arrangement for carrying out the method, in which the fluidized material leaves the single-tube reactor 22 (without a tube inside the fixed bed) and is cooled in an external fluidized bed 23 in a container 24 which is open at the top. The cooled fluidizible material can be recycled to the fixed bed via a cellular wheel sluice 25. The reactor temperature can be adjusted as desired via the amount of fluidizible material recycled, and is completely uniform both radially and axially. The cooled fluidizible material need not necessarily be fed in directly above or below the perforated tray, but can be introduced, possibly as a bleed-stream, at any height above the tray.

Of course, the novel arrangement for carrying out the method is not restricted to the embodiments described above but can be varied further within the framework of the features according to the invention.

The particular advantage achieved using the novel method and the novel arrangement for carrying out the method is that fixed beds can be substantially better heated compared with conventional methods. This has the effect that, in large-scale industrial processes, hot spots in fixed beds can be avoided, with the result that the yield and selectivity of many processes can be improved, and hence feed costs and working up costs can be reduced. Furthermore, by substantially decreasing the number of tubes in the reactors, it is possible to reduce capital costs in the construction of large fixed-bed reactors.

We claim:

1. A method of heating a reactive fixed-bed charge having voids contained in a tube reactor which comprises: passing a fluidized heat transfer material through the voids in said reactive fixed bed charge whereby heat is added to or carried away from the fixed bed; passing said fluidized material from the voids in the fixed bed to a heat exchanger wherein the temperature of said fluidized material is regulated and, thereafter recycling the fluidized material through said voids in said fixed bed.

2. The method of claim 1, wherein a layer of fluidized material is is maintained above the fixed bed.

3. The method of claim 2, wherein the fluidized material is kept in circulation.

4. The method of claim 1, wherein the fluidized material is recycled in tubes leading through the fixed bed.

5. The method of claim 2, wherein recycling of the fluidized material is carried out outside the fixed bed.

6. The method of claim 5, wherein the recycling of the fluidized material is adjusted according to the heat requirement of the fixed bed, by means of suitable transporting elements, independently of the velocity of the reactant gases in the fixed bed.

* * * * *